United States Patent [19]

Hollingsworth

[11] 3,836,094

[45] Sept. 17, 1974

[54] TAPE RECORD MEDIUM AND ROLL

[75] Inventor: Ashley J. Hollingsworth, Atherton, Calif.

[73] Assignee: Newell Industries, Inc., Sunnyvale, Calif.

[22] Filed: Nov. 4, 1968

[21] Appl. No.: 773,209

[52] U.S. Cl. ..................... 242/192, 206/53, 242/74, 242/195, 242/210, 360/134

[51] Int. Cl. ...................... G11b 15/66, B65h 75/28

[58] Field of Search ........... 242/195, 192, 197, 198, 242/74, 71.8; 274/4, 11, 41.4; 206/53

[56] References Cited

UNITED STATES PATENTS

| | | | |
|---|---|---|---|
| 1,747,656 | 2/1930 | Ausloos et al. | 206/53 UX |
| 1,839,407 | 1/1932 | Mercer | 206/53 |
| 3,030,231 | 4/1962 | Bar | 242/74 X |
| 3,370,803 | 2/1968 | Newell | 242/192 |
| 3,468,497 | 9/1969 | Kelley | 242/192 |
| 3,773,276 | 11/1973 | Ganske | 242/192 |

*Primary Examiner*—George F. Mautz
*Attorney, Agent, or Firm*—Flehr, Hohbach, Test, Albritton and Herbert

[57] ABSTRACT

A tape record medium wrapped to form a roll of tape is characterized by a leader formed with means along its edges for engaging the side edges of tape convolutions of the roll to maintain the roll's integrity. A second leader portion no wider than the tape record medium is characterized by a thickness which serves to maintain a predetermined spacing between the take-up hub of a transport employing the roll and a drive capstan surface.

6 Claims, 7 Drawing Figures

PATENTED SEP 17 1974 3,836,094

INVENTOR.

Ashley J. Hollingsworth

BY Flehr, Hohbach, Test, Albritton & Herbert
Attorneys

TAPE RECORD MEDIUM AND ROLL

BACKGROUND OF INVENTION

This invention pertains to rolls of record tape and other elongated record media of a pliable material adapted to be coiled into a roll as used, for example, in magnetic tape transport apparatus. The roll is particularly useful in tape transport apparatus of a type as disclosed for example in U.S. Pat. No. 3,370,803.

As disclosed in the above patent, a roll of tape is shown provided with a leader portion prepared with means extending longitudinally of the leader for gripping and holding the leader to the penultimate outermost convolution of the roll. A roll of tape prepared in the manner taught in the above identified patent is substantially self-sealed against exposure to dust, dirt, and the like, by virtue of the somewhat rigid construction of the roll as packed.

With a roll of the above type any weakness or loss in its sealed characteristic can be expected to first occur at the outermost convolutions of tape of the roll. Thus, while the above style of leader adheres to the penultimate outermost convolution of tape, it may be more desirable to adhere the leader to portions of the roll which are more solidly packed or less likely to be laterally dislodged.

Further, it has been observed that where flanges are not provided on the roll of tape, the outer edge of the roll periphery will be the main region of exposure to damage in handling the roll. Thus, if a roll of tape is dropped, it most likely will strike one of the peripheral edges of the roll.

According to the present invention greater protection is provided for the outer peripheral edges of the roll while, at the same time, providing improved means for adhering the leader to the roll as by engaging the more solidly packed inner convolutions of tape.

SUMMARY OF THE INVENTION AND OBJECTS

According to the invention herein a pliable tape record medium is provided and adapted to be coiled to form a roll thereof, wherein the record medium comprises an information record portion and a leader portion. The record medium is further characterized by gripping means carried along the leader portion in position for engaging portions of the side edges of convolutions of the roll of tape in a manner to retain the outermost convolution of the roll in its coiled position. Preferably the side edge portions of the convolutions of tape which are gripped are provided by those convolutions of tape spaced somewhat inwardly of the outermost convolution of tape.

According to one embodiment of the invention, immediately following the outrmost leader portion of the above type, a second leader portion is provided characterized by a thickness which acts as a spacing element (when wrapped about the take-up hub) so as maintain clearance between the confronting flange surfaces of a drive capstan of a type as shown, for example, in the above identified patent, and the outermost leader portion.

Thus, the take-up hub is, of course, rotated by the drive capstan as disclosed in the above patent and may be operated in forward or reverse direction by virtue of the driving interface formed between the periphery of the drive capstan and the periphery of the roll on the take-up hub. By providing the above mentioned spacer element to be wrapped about the take-up hub there is eliminated any possibility that the take-up hub would be rotated by virtue of any contact between the confronting faces of the flanges of the capstan as might contact the side edges of the leader convolution wrapped about the hub, as will be explained more fully below.

It is a general object of the present invention to provide an improved roll of the above type for feeding between supply and take-up hubs.

It is another object of the invention to provide a roll of tape wherein the outermost convolution is adhered to the penultimate outermost convolution of the roll by means extending along the side edges of the convolutions.

It is another object of the invention to provide a pliable tape record medium adapted to be coiled about a take-up hub and to space the side edges of the innermost convolution (as wrapped about the take-up hub) from contact with overhanging flange portions as might be carried by the drive capstan.

These and other objects of the invention will be more readily apparent from the detailed description further below when considered in conjunction with the drawings.

DESCRIPTION OF THE PREFERRED EMBODIMENTS

Figures 1, 3:
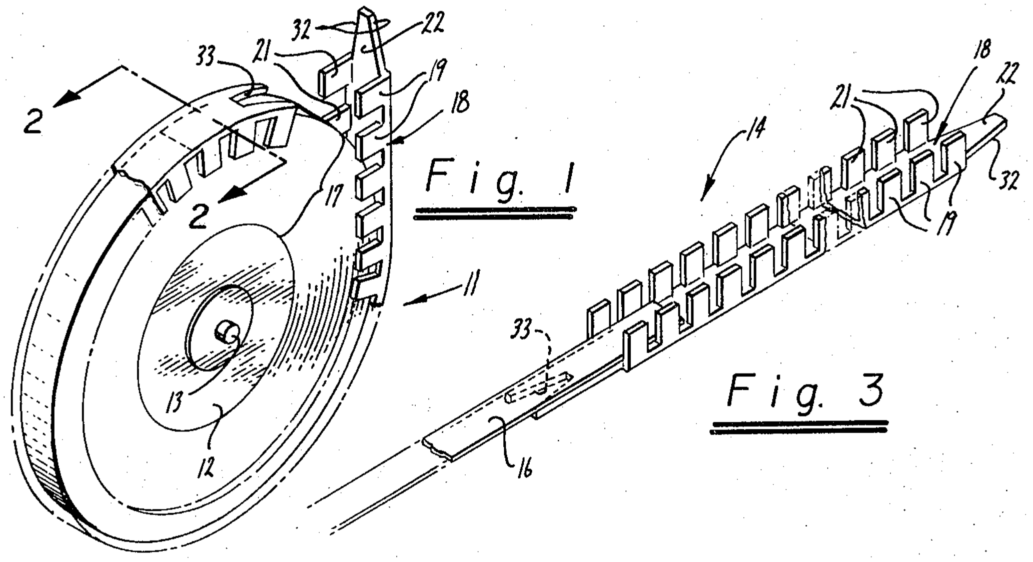
FIG. 1 is a perspective view of a pliable tape record medium wrapped to form a roll of tape according to the invention.
FIG. 3 is a perspective view showing a pliable tape record medium according to the invention.

Referring to FIG. 1 there is shown a roll of tape 11 comprised of a hub 12 formed with laterally protruding spindles (only one of which is shown) 13 to be supported for rotation by suitable means, such as a fork element (not shown). Roll 11 further includes a pliable tape record medium 14 (FIG. 3), which includes an elongated magnetic recording tape record portion 16 wrapped to form a number of convolutions 17, and also includes a leader portion 18.

Leader 18 is characterized by gripping means carried along the leader portion in position for engaging the side edges of convolutions 17 of the roll and located at positions displaced radially inwardly of the outermost convolution. Thus leader 18 is formed of a resilient, though somewhat stiff, material such as plastic, prepared with a series of gripping tabs or fingers 19 disposed in confronting relation to a similar series of gripping fingers 21 and disposed along the opposite side of leader 18. Fingers 19 and 21 are formed to have a natural spacing therebetween less than the width of the record convolutions 17 so as to press against the side edges of convolutions 17 in the manner shown in FIG. 2.

Figure 2:
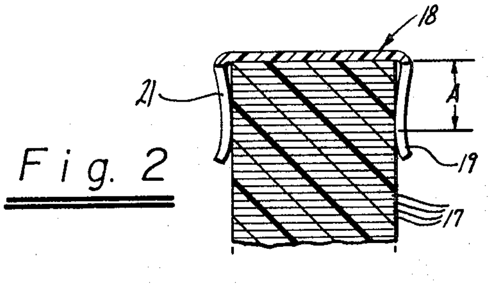
FIG. 2 is a cross-section enlarged, detailed view taken along the line 2—2 of FIG. 1.

It will be observed (FIG. 2) that the retentive engagement made between the fingers 19, 21 and convolutions 17 is made at a location radially inwardly remote as shown by the dimension "A" in FIG. 2. In this manner engagement is made with a more firmly packed group of tape convolutions than might otherwise occur if engagement were to be made with the penultimate outermost convolution as described at the outset above.

Figure 4:
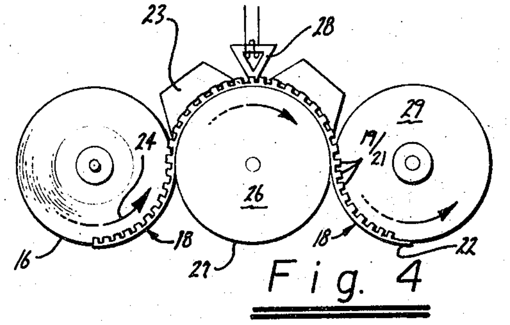
FIG. 4 is a diagrammatic illustration of the utilization of the tape record medium shown in FIGS. 3 and 1 in apparatus of the type disclosed in the above identified patent.

The outermost or bitter end 22 of leader 18 remains free to extend naturally away from the outermost convolution of the roll in a position adapted to be engaged by a peeling element 23 which serves to release the grip between the leader portion and the roll when the roll is unwrapped by feeding tape from the roll to a take-up hub, as shown, for example, in FIG. 4. Thus the roll is suitable for being automatically threaded in a manner similar to that shown in the above identified patent wherein a peeling element 23 engages the naturally outwardly extending end 22 to release the grip of fingers 19, 21 from the roll as it is rotated in the direction shown by the arrows 24.

Referring to FIG. 4 it is to be understood that a drive motor (not shown) rotates a capstan 26 formed with a driving peripheral surface 27. A yieldingly supported transducer 28 rides along the unobstructed underside of leader 18 and ultimately cooperates with the magnetically recorded paths formed along record portion 16.

Upon arrival at the take-up hub 29 leader 18 is disposed in a manner whereby fingers 19, 21 engage the opposite side faces of hub 29 and engage same so as to commence wrapping the tape record medium 14 onto hub 29.

It is to be understood, as disclosed in the above identified patent, that the supply and take-up hubs shown in FIG. 4 are yieldingly urged against the periphery of drive capstan 26 by suitable means, such as springs.

One suitable material which is sufficiently flexible while remaining reasonably stiff for providing the leader 18 has been found to be Mylar plastic material of the type which can be heat set to take and retain the configuration formed under heated conditions. Thus, to form the leader 18 it is necessary only to cut and form fingers 19, 21 from a single sheet of material and then to fold the fingers about a line approximating the longitudinal side edges of the roll while maintaining the application of heat to the leader. When allowed to cool fingers 19, 21 remain permanently bent into the configuration shown.

From the above description and inspection of the drawing, it is apparent that the leader 18 may be substantially thicker than the thickness of the record portion 16 whereby upon being wrapped about take-up hub 29 a bump in the periphery of the roll being formed on take-up hub 29 can occur at the point of transition between the trailing end of the leader and the leading end of the record portion. However, the longitudinal extent of leader 18 corresponds substantially exactly to the circumference of hub 29 in an effort to eliminate the provision of any deleterious bump being formed on the periphery of the take-up roll. In addition, it is to be observed that the leading end 22 of leader 18 includes portions which are tapered, as at 32 along its laterally spaced converging side edges. The other end of leader portion 18 includes a complementary relieved portion 33 that acts to receive the tapered portion 32, at least partially, when wrapped about hub 29. It will be apparent that even though the periphery of hub 29 is not precisely the exact circumference of leader 18, a limited tolerance is provided by the matching of the tapered portion 32 into relieved portion 33, whereby it is only necessary that the leading end of portion 32 penetrate slightly into portion 33 in order to eliminate the occurrence of a bump on the periphery of the roll formed on hub 29.

While not mentioned specifically above, it is evident that the record portion 16 of medium 14 shall be suitably adhered, as by cementing or otherwise, to the trailing end of leader 18.

Figure 5:
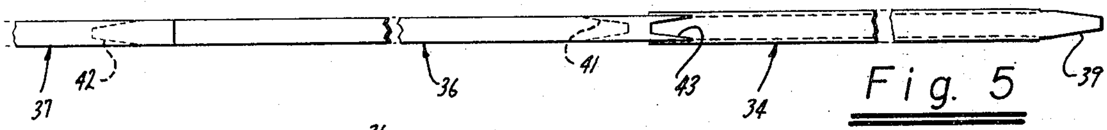
FIGS. 5 and 6 are respectively plan and side elevation views of another embodiment according to the invention.
Figure 6:
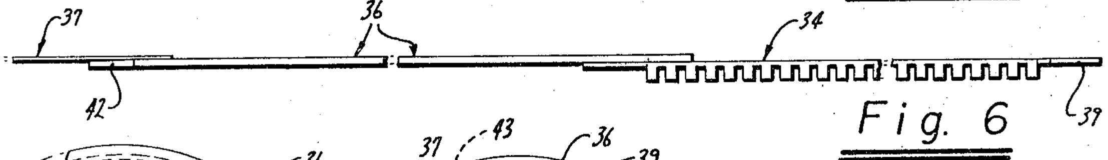

According to another embodiment as disclosed in FIGS. 5 and 6, a leader 34 of a type comparable to leader 18 described above is attached to a second leader portion 36 disposed longitudinally between leader 34 and the information record portion 37. The embodiment disclosed in FIGS. 5 and 6 is particularly useful in overcoming a possible problem which can occur in an apparatus of the kind described in the above identified patent as now to be explained.

Figure 7:
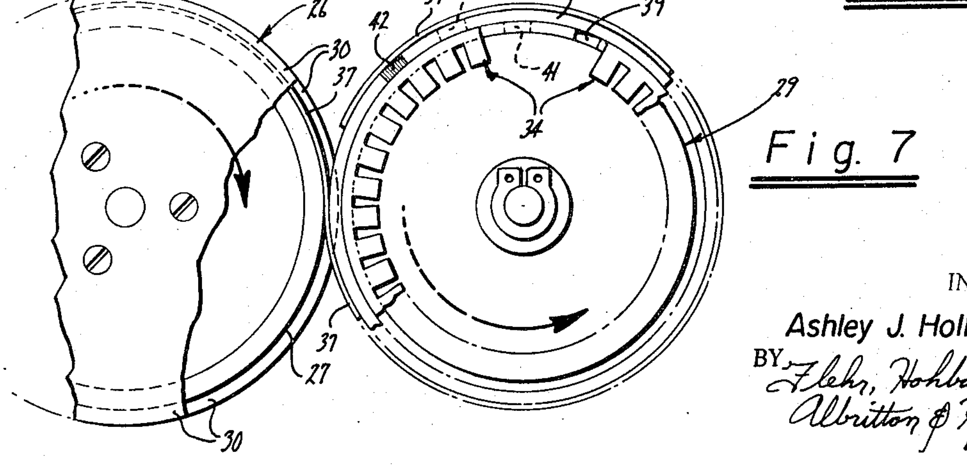
FIG. 7 is an enlarged diagrammatic showing of utilization of the embodiment of FIGS. 5 and 6 employed in apparatus of the type shown in the above identified patent.

Thus with reference to FIGS. 4 and 7, it is to be understood that the drive capstan 26 is formed with a driving periphery 27 in the form of a rubber tire or other resilient driving surface which is flanked on its opposite sides by confronting surfaces of flanges 30. The compressive force acting between the roll of tape and driving periphery 27 can ordinarily be expected to provide sufficient pressure whereby periphery 27 is the main driving interface with the roll.

On the other hand, under certain circumstances, it may be that the confronting surfaces of the flanges may extend or "reach" radially across the edges of the last few convolutions to engage the side edges of the wider leader, such as leader 34 or 18. In that instance if this flange contact with the leader is sufficient it can cause the flange to provide the driving interface for rotating the roll rather than the tire, and accordingly the speed of the roll will change in an undesired manner.

The embodiment shown in FIGS. 5 and 6 which include the leader portion 36 serves to maintain sufficient radial clearance between the side edges of leader 34 and the surfaces of flanges 30 so as to preclude such undesired contact and avoid the foregoing problem.

As shown in FIG. 6, the embodiment comprises an information portion 37, a first leader portion 34 characterized by gripping means carried along the side edges thereof (as above explained) and in position for engaging portions of the side edges of convolutions of a roll of tape. The second leader portion 36 is disposed between the first leader portion 34 and information portion 37 and is characterized by a width which is no greater than the width of the information portion. The length of leader portion 36 is adapted to correspond to the circumference of the take-up hub 29 while the thickness of leader portion 36 is on the order of at least a plurality of thicknesses of the information portion 37 and sufficient to provide radial spacing from take-up hub 29 for clearance between the flanged capstan 26 and the side edges of leader portion 34.

From the foregoing it will be readily evident that the last described embodiment provides a pliable elongated tape record construction capable of being coiled upon the take-up hub 29 so as to form a take-up roll of tape having innermost and penultimate innermost convolutions, the innermost convolution being formed to include gripping means disposed along the side edges of same for engaging the side faces of hub 29. The penultimate innermost convolution is characterized by a width no greater than the width of the remaining convolutions constituting the record portion, but is characterized by a thickness which is sufficient to space the flanges 30 of capstan 26 clear of the innermost convolution on the takeup hub until all of the convolutions comprising information record portion 37 have been unwrapped from hub 29.

Finally, in order to eliminate the occurrence of a surface irregularity or bump in the periphery of the roll formed on take-up hub 29 by virtue of the employment of the relatively thick leaders 34, 36 coupled in tandem, the tapered outer end 39 cooperates in the manner above described with the relieved portion 41 while the tapered trailing end 42 cooperates with relieved portion 43. Thus the opposite ends of those lengths of the tape record construction which are utilized to form both the innermost and penultimate innermost convolutions include a tapered portion and a relieved portion for cooperating with the taped portion.

I claim:

1. A pliable tape record medium adapted to be coiled to form a roll thereof, said record medium comprising an information portion, a first leader portion characterized by gripping means carried along same and in position for engaging portions of the side edges of convolutions of the roll of tape to retain the outermost convolution of the roll in its coiled position and portions of the side faces of a take-up hub when wrapped about same, and a second leader portion disposed in tandem between said first leader portion and said information portion, said second leader portion being characterized by: a width no greater than the width of said information portion; a length adapted to correspond to the circumference of a take-up hub; and a thickness on the order of at least a plurality of thicknesses of said information portion adapted to provide sufficient radial spacing from said take-up hub for clearance between a flanged capstan and the side edges of said first leader portion.

2. In a tape transport apparatus of a type employing a drive capstan having flanges bounding the drive surface of the capstan and with a take-up hub and the drive surface disposed in driving relation, a pliable elongated tape record construction coiled upon the take-up hub to form a roll having an innermost and a penultimate innermost convolution and other convolutions disposed radially outwardly of the hub, the last named convolutions including record portions of the roll, said innermost convolution being formed to include gripping means disposed along the side edges of said innermost convolution and serving to engage the sides of said hub, said penultimate innermost convolution being characterized by a width no greater than the width of said other convolutions and a thickness sufficient to space the flanges of the capstan clear of said innermost convolution until all of said other convolutions have been unwrapped from said hub.

3. A pliable tape record medium according to claim 2 wherein the opposite ends of those lengths of said tape record construction forming both said innermost and penultimate innermost convolutions include a tapered portion having laterally converging spaced edges and, at an opposite end, a complementary relieved portion adapted to receive the tapered portion at least partially therein when wrapped about said hub.

4. A pliable tape record medium adapted to be coiled to form a roll thereof, said record medium comprising an information record portion and a leader portion, said medium being characterized by gripping means carried along the leader portion in position for engaging portions of the side edges of convolutions of the roll of tape to retain the outermost convolution of the roll in its coiled position, an end of the leader portion remaining free to extend naturally away from the outermost convolution in position adapted to be engaged by an element serving to release the grip defined between the leader portion and the roll, and a portion at said end being tapered along its laterally spaced edges and the other end of the leader portion including a complementary relieved portion adapted to receive the tapered portion at least partially therein when wrapped about a hub having a circumference corresponding to the longitudinal spacing between said leader end portions.

5. In a tape record medium, a roll of recording tape adapted to be wrapped about a take-up hub, a leader having a flexible body with a leading end and a trailing end, the trailing end being fastened to the outermost end of the tape, flange means extending from the edges of the leader body for gripping the side edges of the tape when said tape is in its rolled condition and gripping the take-up hub when the tape is wrapped thereabout, the length of the leader being greater than the circumference of the take-up hub, one end portion of the leader being cut away along its laterally spaced edges to form a tongue and the other end portion being cut away to form a relieved portion in which the tongue is at least partially received when the tape is wrapped about the take-up hub.

6. A tape record medium according to claim 5 wherein the flange means comprises a plurality of spaced apart resilient teeth extending radially inwardly of the roll.

* * * * *